United States Patent [19]

Lynn

[11] Patent Number: 5,535,570
[45] Date of Patent: Jul. 16, 1996

[54] WING-TOGGLE WALL ANCHOR

[76] Inventor: James P. Lynn, 3 Salem La., Jackson, N.J. 08527

[21] Appl. No.: 346,938

[22] Filed: Nov. 23, 1994

Related U.S. Application Data

[63] Continuation of Ser. No. 088,739, Jul. 7, 1993, abandoned.
[51] Int. Cl.$^6$ ................................................ E04B 1/38
[52] U.S. Cl. ........................... 52/698; 411/340; 411/345
[58] Field of Search ............................. 52/698; 411/340, 411/344, 345, 346

[56] References Cited

U.S. PATENT DOCUMENTS 4,502,826  3/1985  Fafard ..................................... 411/340
5,139,377  8/1992  Reed ....................................... 411/340

Primary Examiner—Creighton Smith

[57] ABSTRACT

A wall anchor comprising the combination of a round locking nut and a unique swing-toggle holds a greater weight, while using a smaller drill hole, than existing with typical toggle bolt anchors. The swing-toggle is generally in the configuration of a cylinder, inwardly sliced open from both its opposing ends an arc distance greater than the diameter of the toggle bolt being accommodated and a length to still allow flush and fast securement behind the wall. A pair of projections inwardly facing from the cylinder walls seat between adjacent threads of the toggle bolt in facilitating the securement, while their placement allows for a downwardly pivoting of the swing-toggle once the anchor is inserted through the drill hole in the wall.

3 Claims, 2 Drawing Sheets

5,535,570

WING-TOGGLE WALL ANCHOR

This application is a continuation of Ser. No. 08/088,739, now abandoned, filed Jul. 7, 1993.

FIELD OF THE INVENTION

This invention relates to wall anchors and, more particularly, to a wall anchor employing a toggle bolt for securement behind the wall to which such items as fire extinguishes, hose reels, pictures, conduit hangers, etc. are to be fastened.

BACKGROUND OF THE INVENTION

As is well known and understood, typical toggle bolt wall anchors require the drilling of a hole into the wall a diameter significantly greater than the bolt which is to be inserted. When using a 3/16" toggle bolt diameter, a 1/2" is generally required; when using a 3/8" diameter toggle bolt, on the other hand, a 1" hole is usually called for.. As will be appreciated, problems attendant to this follow from the need of having to get a large diameter drill bit to make a larger hole, or to go with a smaller diameter bolt—accepting its inability to hold greater weights—if only a small diameter drill bit is possessed.

As will be appreciated by those skilled in the art, it would be desirable if one could sustain and support a greater weight using a larger toggle bolt and smaller hole—and, in addition, to employ an anchor whose securement will continue over time, free of the effects of vibration.

BACKGROUND OF THE INVENTION

As will become clear from the following description, the wall anchor of the present invention comprises the combination of a round locking nut and a unique swing-toggle effective in holding a greater weight, while using a larger bolt and smaller hole than typifies the toggle bolt anchors in present use today. The swing-toggle will be seen to be in the general configuration of a cylinder, inwardly sliced open from both its opposing ends, an arc distance greater than the diameter of the toggle bolt being accommodated, and of a length to still allow flush and fast securement behind the wall. A pair of projections inwardly facing from the cylinder walls will be seen to be included so as to seat between adjacent threads of the toggle bolt in facilitating the securement, while their placement allows for downwardly pivoting of the swing-toggle once the anchor is inserted through the drill hole in the wall. In a preferred embodiment of the invention—to be described hereinafter, each of the pair of projections inwardly face one another from spaced-apart locations along the cylinder. With the outer diameter of the round locking nut in this embodiment being selected substantially equal to the outer diameter of the cylinder, with the round locking nut being further internally threaded to accept the external thread of the toggle bolt, and with the pair of projections inwardly extending a distance from the opposing walls of the cylinder to allow for the pivoting action to take place, the end result of the use of this type wall anchor will be appreciated by those skilled in the art to align the cylinder substantially perpendicular to the length of the toggle bolt once installed behind a wall in providing a fast securement.

BRIEF DESCRIPTION OF THE DRAWING

These and other features of the present invention will be more clearly understood from a consideration of the following description, taken in connection with the accompanying drawing, in which.

DETAILED DESCRIPTION OF THE DRAWING

Figure 5:
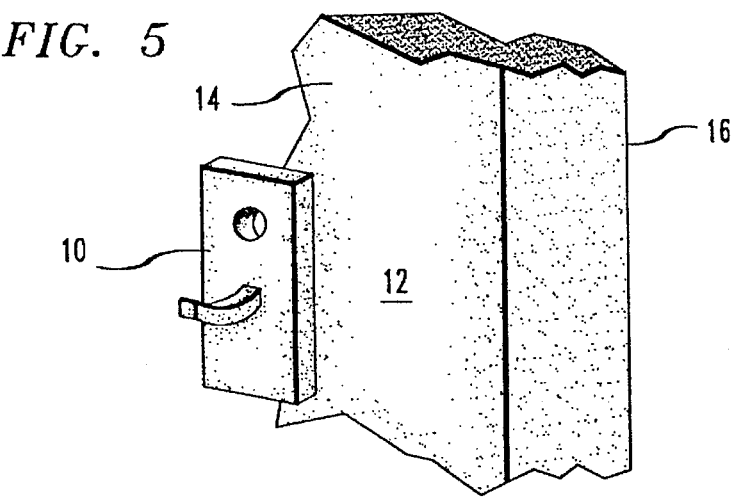
FIGS. 5 and 6 are illustrations helpful in an understanding of the manner of utilizing the swing-toggle wall anchor of the invention.

In FIG. 5, reference numeral 10 identifies the item or piece to be hung, while reference numeral 12 identifies the wall to which the item or piece is to be secured. The front of the wall 12 is shown at 14, reference numeral 16 identifying the back of the wall.

Figure 3A:
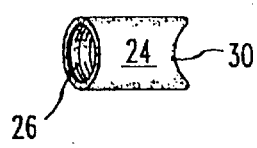
FIGS. 3a–3c show front, left end and right end views of a round locking nut useful in the operation of the wall anchor of the invention.
Figure 3B:
Figure 3C:
Figure 4A:
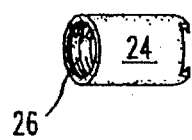
FIGS. 4a–4c show front, left end and right end views of another round locking nut useful with the wall anchor teachings described herein.
Figure 4B:
Figure 4C:
Figure 6:
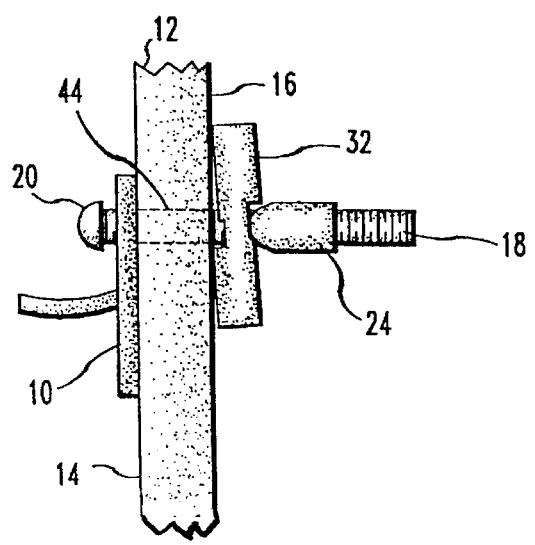

The wall anchor of the invention (FIG. 1) employs a toggle bolt 18, having a cap end 20 and is shown of a diameter $D_1$ and with an external thread 22. A round locking nut 24 of an outer diameter $D_2$ greater than the diameter $D_1$ is internally threaded, as at 26, to accept the external thread 22 of the toggle bolt 18. As more particularly shown in FIGS. 3a–3c, one embodiment of the locking nut 24 has its facing edge 30 machined away so as to later serve as a stop and brace against a swing-toggle 32 (positioned between the locking nut 24 and the cap end 20, and to be subsequently described) in holding the toggle 32 fast against the back of the wall 16 when securing the item or piece 10, in position (FIG. 6). With the alternative arrangement for the locking nut 24 as shown in FIGS. 4a–4c, on the other hand, the facing edge 30 of the nut 24 is alternatively machined in a different manner, yet continuing to enable the internal threads 26 of the nut 24 to accept the external threads 22 of the bolt 18.

Figure 2A:
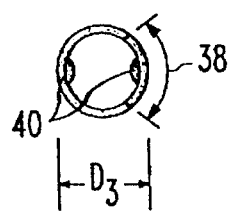
FIGS. 2a–2d show top, bottom, left end and right end views of the swing-toggle of the invention, respectively.
Figure 2B:
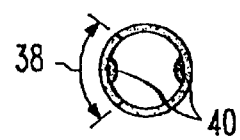
Figure 2C:
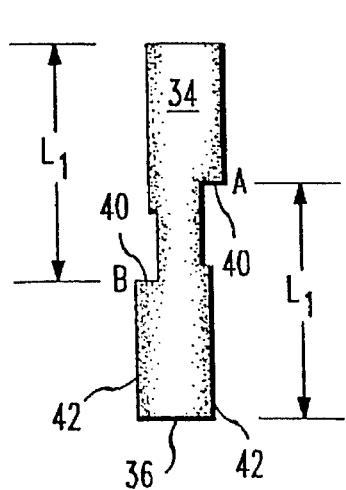
Figure 2D:
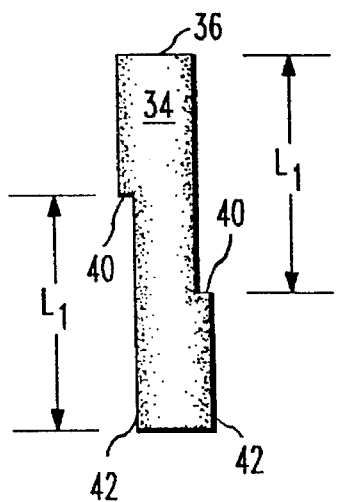

Referring to FIGS. 2a–2d, on the other hand, the swing-toggle 32 will be noted as being in the configuration of a cylinder 34, inwardly sliced open from both its opposing ends 36 an arc distance 38 greater than the diameter $D_1$ of the toggle bolt 18, and of a given length $L_1$. As illustrated in FIGS. 2c and 2d, the cylinder 34 incorporates a pair of projections 40 inwardly facing from the opposing walls 42 of the cylinder 34, to seat between the adjacent threads 22. Each of the projections 40 will further be noted to extend inwardly towards one another from spaced-apart locations A, B along the cylinder 34 so as to allow for a downward pivoting action to be had by the swing toggle 32 once behind the back wall 16, and under the effects of gravity. In accordance with a preferred embodiment of the invention, the outer diameter $D_3$ of the cylinder 34 is selected substantially equal to the outer diameter $D_2$ of the locking nut 24. Once the cylinder 34 and round locking nut 24 are inserted through a drilled hole 44 into the wall 12—and in position for securement—the cylinder 34 will be appreciated to align itself substantially perpendicular to the length of the toggle bolt 18 (FIG. 6).

In usage, the outer diameter $D_2$ of the locking nut 24 and the outer diameter $D_3$ of the cylinder 34 are selected only slightly greater than the diameter $D_1$ of the toggle bolt 18.

Figure 1:
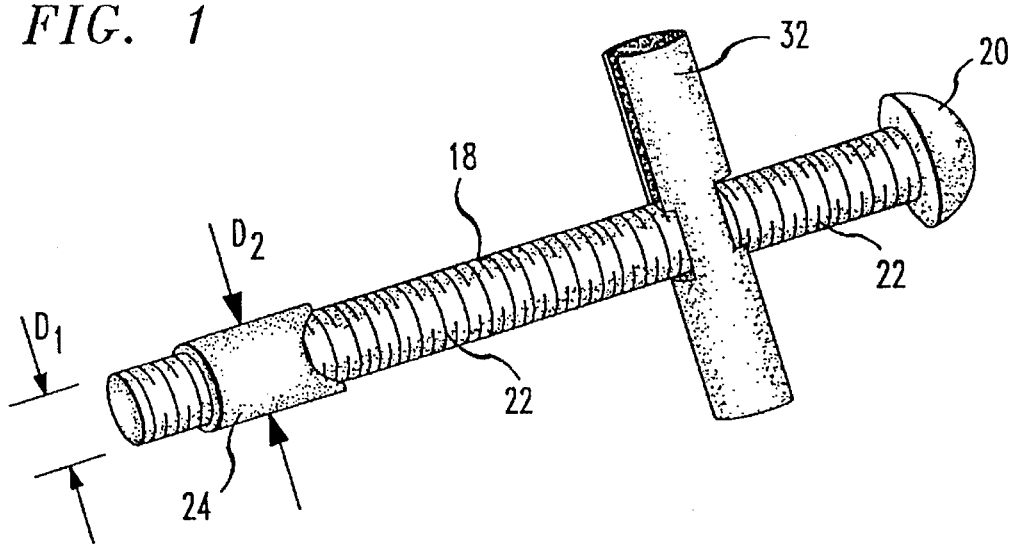
FIG. 1 is a perspective view helpful in an understanding of the wall anchor embodying the principles of the invention.

A hole 44 is then drilled through the front surface 14 of the wall 12 substantially equal to the outer diameters of the nut 24 and the cylinder 34; the toggle bolt 18, together with the round locking nut 24 and cylinder 34 is then manually inserted, with the locking nut 24 situated adjacent to the end of the bolt 18 remote from the cap end 20 (FIG. 1). Once clear of the back wall 16, the cut-away cylinder 34 then pivots downward, behind the wall 12, to be then secured against the wall 12 by drawing back on the bolt 18, thereby bringing the round locking 24 to bear against the cylinder 34, then aligned perpendicular to the length of the bolt 18 so as to secure the bolt in position, hanging the item or piece 10 in fast securement (FIG. 6). Experimentation has shown that a ⅜" toggle bolt could be utilized in this manner in a ½" drilled hole, in providing a greater strength characteristic than previously available where only a 3/16" diameter toggle bolt could be fitted through such a hole using typical and readily available present-day toggle anchors. As will also be understood, smaller holes would have to be drilled using the apparatus of the invention, to provide a similar strength support as available with present devices, thereby obviating the need to search for larger drill bits when heavier items or pieces are intended for fast securement to the wall.

While there have been described what are considered to be preferred embodiments of the present invention, it will be readily understood by those skilled in the art that modifications can be made without departing from the scope of the teachings herein, of using a swing-toggle which falls by its own weight into position once inserted into the drilled hole, and then oriented to a perpendicular position to fit flush against the back side of the wall 16 by means of drawing back on the bolt 18 a sufficient amount to have the locking nut provide the needed bearing force in completing the securement. For at least such reason, therefore, resort should be had to the claims appended hereto for a true understanding of the scope of the invention.

I claim:

1. A wall anchor comprising:

a toggle bolt having a cap end, and of given diameter and external thread;

a round locking nut on said bolt at a position remote from said cap end:

a swing toggle on said bolt at a location intermediate said locking nut and said cap end; and with said swing-toggle being in the configuration era cylinder inwardly sliced open from both its opposing ends an arc distance greater than the diameter of said toggle bolt and of a predetermined length, and further incorporating a pair of projections inwardly facing from opposing walls of said cylinder to seat between spaced apart threads on said bolt;

with each projection of said pair of projections offset longitudinally from one another along said length of said cylinder to only engage against threads on said bolt when said cylinder is inserted through said wall; and with said round locking nut being internally threaded to draw together with the external threads of said toggle bolt in locking said cylinder in place behind said wall.

2. The wall anchor of claim 1, wherein the outer diameter of said round locking nut is selected substantially equal to the outer diameter of said cylinder.

3. The wall anchor of claim 1, wherein said pair of projections inwardly extend a distance from said opposing walls of said cylinder to align said cylinder substantially perpendicular to the length of said toggle bolt when said bolt and said cylinder are installed behind said wall in position for securement thereto.

\* \* \* \* \*